DEFENSIVE PUBLICATION

UNITED STATES PATENT OFFICE

Published at the request of the applicant or owner in accordance with the Notice of Dec. 16, 1969, 865 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 30, 1970

875 O.G. 713

T875,024

POLYMERIC ANTHRACENE KETONIC DERIVATIVES

Nathan H. Canter, 43 Eileen Way,
Edison, N.J. 08817

Filed May 9, 1968, Ser. No. 728,042
Int. Cl. C08g 33/00
U.S. Cl. 260—78.4
No Drawing. 14 Pages Specification An endoanthracene maleic anhydride (9,10-endoanthracene-11,12-dicarboxylic anhydride-9,10-dihydro) polymer and process for preparing said polymer which comprises reacting endoanthracene maleic anhydride in the presence of a Friedel-Crafts catalyst. Polymers of this invention are readily cured by compounds such as amines for ketonic groups and sulfonic acids, sulfonyl halides, acyl halides and primary or secondary hydrocarbon halides for aromatic groups which are reactive with ketonic and aromatic groups. The polymer has exceptional thermal stability and is suitable for use as a coating material for rocket nose-cones and the like.